United States Patent [19]
Guillet

[11] 3,811,931
[45] May 21, 1974

[54] METAL CONTAINER COATED WITH PHOTODEGRADABLE COMPOSITION
[75] Inventor: James Edwin Guillet, Don Mills, Ontario, Canada
[73] Assignee: Ecoplastics Limited, Thornhill, Ontario, Canada
[22] Filed: Feb. 7, 1972
[21] Appl. No.: 224,334

[30] Foreign Application Priority Data
Feb. 15, 1971   Great Britain ..................... 4682/71

[52] U.S. Cl. 117/132 B, 117/161 UH, 117/161 UN, 117/161 UC
[51] Int. Cl. .................... B32b 15/08, C09d 3/62
[58] Field of Search ........ 260/65, 80.73; 117/132 C, 117/161 UT, 132 B, 161 UH, 161 UN, 161 UC

[56] References Cited
UNITED STATES PATENTS

| | | | |
|---|---|---|---|
| 3,051,685 | 8/1962 | Slocombe et al. | 260/63 R |
| 3,037,963 | 6/1962 | Christenson | 260/80.73 X |
| 2,632,704 | 3/1953 | Lowe et al. | 96/114 |

FOREIGN PATENTS OR APPLICATIONS

| | | | |
|---|---|---|---|
| 1,915,576 | 10/1970 | Germany | 117/132 |
| 1,474,058 | 3/1967 | France | 117/132 |
| 1,128,793 | 10/1968 | Great Britain | 260/63 |

OTHER PUBLICATIONS
Slocombe, "Multicomponent Polymers," Jour. of Poly. Sci., Vol. XXVI, pps. 9–22 (1957).

Primary Examiner—William D. Martin
Assistant Examiner—Harry J. Gwinnell
Attorney, Agent, or Firm—Ridout & Maybee

[57]   ABSTRACT
A disposable substrate of degradable material, such as a metal container, is provided with a photodegradable polymeric coating. The coating is water impermeable initially, but upon exposure to ultraviolet light degrades to become water permeable allowing water to contact and assist in degradation of the substrate. Suitable coatings are polymers containing side chain ketone groups, such as copolymers of vinyl monomers and vinyl ketones.

5 Claims, No Drawings

METAL CONTAINER COATED WITH PHOTODEGRADABLE COMPOSITION

BACKGROUND OF THE INVENTION

1. Field of the Invention

This invention relates to new coating compositions for use in the manufacture of disposable containers such as cups, bottles, cans, etc., used for packaging perishable commodities such as food, condiments, beverages and the like. In particular it relates to disposable containers coated with compositions which when used for such purposes and subsequently discarded in an outdoor environment, will degrade to become part of the soil, or be washed away by rainfall or wind erosion in a harmless form.

2. Description of the Prior Art

It is well known that the increasing use of disposable metal containers which are then discarded has created serious problems of pollution and litter. Because most containers have been selected to have long lifetimes in exterior environments the accumulation of such litter in parks and recreational areas, and even in conventional garbage dumps has led to many environmental and esthetic problems. It is obvious that containers which will degrade to harmless products in such a situation will have a great economic advantage over conventional containers such as glass bottles or aluminum cans.

It might be possible to include in the material from which a container is made an agent which causes the container to decompose at a constant rate, independent of the environment, but in such a case the shelf life of the package must be rigidly controlled, which is difficult to do in most cases. The most desirable situation would be to have the container start to degrade only after it has been discarded.

SUMMARY OF THE INVENTION

In my invention there is provided a substrate, for example a container, fabricated from a metal, such as steel, which tends to rust rapidly due to air oxidation in the presence of water. Such a container is then coated on its exterior surface with a coating resin having the property of becoming water permeable after exposure to ultraviolet light from the sun but not after exposure to visible light.

Accordingly this invention provides a degradable substrate coated on at least one surface with a water susceptible coating resin which is initially water impermeable but which becomes water permeable after exposure to ultraviolet light.

Preferably the substrate is of a metal such as steel which tends to rust rapidly due to air oxidation in the presence of water. According to a preferred embodiment of the invention the substrate is a metal container. The interior of the container may be coated with any type of coating giving the desired resistance to the material being packaged.

Such a container is stable under normal storage conditions until exposed to ultraviolet light. If, however, it is discarded outdoors, after a suitable exposure to ultraviolet light the exterior coating no longer protects the metal from corrosion and it rusts away under the action of moisture and oxygen to become part of the soil.

Coatings having this characteristic may be prepared in the following manner:

1. A water soluble or water susceptible resin is synthesized containing along the backbone of the resin molecule a photochemically active group such as the ketone carbonyl of the general structure:

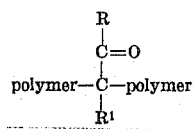

where R may be any alkyl, cycloalkyl, aryl, alkenyl or alkaryl group of from one to 10 carbon atoms, and $R^1$ may be H or any alkyl, cycloalkyl, aryl or alkaryl group of from one to seven carbon atoms. Saturated groups for R and $R^1$ are preferred.

2. The water soluble or susceptible resin is applied to the substrate to give a coating which is not sensitive to, i.e., impermeable to, water.

By water susceptible resin is meant a resin which after exposure to ultraviolet light either i. becomes water soluble, so that the coating dissolves away from the substrate in water, or ii. becomes water permeable, so that water is transported with relative ease through the coating to attack the substrate, or iii. loses its adhesion to the substrate so that water causes coating to peel away from the substrate and permit decomposition thereof to occur, or iv. permits access of moisture to the substrate by forming cracks or crazes in the coating, or v. loses its water barrier characteristics either to liquid water or water vapour by any other mechanism.

DESCRIPTION OF THE PREFERRED EMBODIMENTS

In one embodiment, an initially water soluble or susceptible resin containing the aforementioned photochemically active group is used, and applied to the substrate by deposition from an aqueous coating formulation. The resin coated on the substrate assumes a water-impermeable form, for example by inclusion of a curing step, to cross-link the resin after it is applied to the substrate. In this manner, one can start with a water soluble or water susceptible resin, and impart water resistance and water impermeability to it by curing. For this purpose, the resin may include in its chemical structure groups which permit it to be cross-linked by air drying or by a thermal treatment.

When such a cured resin is exposed to visible light there is no change in its physical or chemical properties, but when exposed to ultraviolet light, scission of the resin backbone occurs adjacent to the ketone carbonyl groups when such light is absorbed by the group. Each scission is equivalent to breaking a cross-link and hence is a reversal of the curing process. When sufficient light has been absorbed the coating will become water permeable or may even become water-soluble. Under these conditions rapid corrosion of the substrate will occur and the container will eventually disintegrate.

In other embodiments, the photochemically active group containing resins applied do not form satisfactory application compositions with water. In such cases, the resins may be applied to the substrate by other well known coating methods applicable to thermoplastic materials such as hot melt applications, solution casting from non-aqueous solutions, etc.

The wavelengths of light emitted by the sun range from about 3,000 A in the ultraviolet to about 20,000 A in the infrared. Only the light with wavelengths ranging from about 4,000 to 8,000 A is visible to the human eye. Most indoor lighting fixtures emit primarily in this visible range. In accordance with this invention, photochemically active groups are introduced into the coating resin applied to the container which do not absorb in the visible range, and hence are unaffected by ordinary interior lighting, but do absorb the ultraviolet radiation in the wavelength range from 3,000 A to about 3,500 A. Thus the degradation process is not initiated until the polymer is exposed to the ultraviolet light of the sun. Furthermore, because ordinary window glass absorbs most of the ultraviolet radiation of the sun these compositions will not degrade in sunlight which has passed through window glass. The packages or containers could be exhibited in store windows, for example, without initiating the degradation process. It has been found that only very specific coating compositions will meet all of these requirements.

One of the more important classes of coating resins used for container and packaging purposes are polymers of vinyl monomers of the general structure

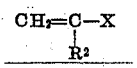

where $R^2$ is hydrogen or a lower alkyl group and X is a functional group such as phenyl, substituted phenyl, carboxylic acid, ester, halogen, nitrile, or alkenyl. These polymers break down slowly by photo-oxidation in an outdoor environment, but coatings still retain an appreciable portion of their original ability to protect the substrate from deterioration for several years under normal weather conditions.

The vinyl polymers used in the coating composition on substrates according to this invention have accelerated rates of degradation. It has been discovered that if a polymer is prepared having a ketone carbonyl group not in the backbone but attached to a carbon atom immediately adjacent to the backbone chain of the vinyl polymer, the efficiency of the chain breaking reaction is increased at least five to ten times that of similar polymers which do not contain ketone groups.

The desired structure which is to be included in the polymer backbone is of the form:

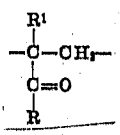

where R and $R^1$ are as previously defined. In preferred vinyl resins, R is an alkyl or aryl group of from one to nine carbon atoms and $R^1$ is hydrogen or an alkyl group of from one to six carbon atoms.

Such a structure may be introduced into the polymer chain by copolymerization, with a vinyl monomer, of a monomer of the general structure:

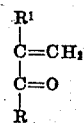

where R and $R^1$ are defined above. Examples of such monomers are methyl vinyl ketone, methyl isopropenyl ketone, ethyl vinyl ketone, propyl vinyl ketone, isopropyl vinyl ketone, buty vinyl ketone, methyl isopropenyl ketone, ethyl isopropenyl ketone, methyl isobutenyl ketone, phenyl vinyl ketone, and the like.

In order to achieve the maximum effect it is desirable that the ketone groups be distributed throughout the entire polymer chain and preferably at maximum distance from each other. Further, it is important that most of the polymer chains contain some ketonic groups, otherwise some of the polymer will not degrade photochemically. If the copolymer is prepared by copolymerization with a vinyl monomer it will be desirable to select a monomer having the correct reactivity ratio so that a uniform copolymer is obtained. Alternatively one may use a continuous process whereby the monomer ratio in the reactor is kept constant throughout the reaction.

The process and compositions which can be used in the practice of this invention are not restricted to binary copolymers with a ketone co-monomer, but will also apply to multicomponent copolymers with other monomers. Monomers which may be used to synthesize the copolymers useful as coating resins in this invention include ethylene, styrene, methyl acrylate, methyl methacrylate, methacrylonitrile, acrylonitrile butadiene, isoprene, vinyl acetate, vinyl chloride, acrylic acid and methacrylic acid. Especially preferred are polymers of styrene, ethylene, methyl methacrylate or methyl acrylate.

The methods of preparing such copolymers are within the skill of the art and include free radical copolymerization of the mixed monomers, e.g., using peroxide catalysts, or heat generated free radicals, for initiation.

An alternative method of including the ketone group in the backbone of the polymer resin is to condense a polyester, polyamide, polyurethane, or similar resin including a monomer of the general structure:

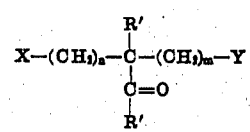

where n and m are integers from one to 10, R and R' are as defined previously and X and Y are functional groups capable of condensing with the other monomers used in the resin. Typical functional groups are hydroxy (—OH), carboxyl (—COOH), ester (—COOR), amine (—NH$_2$), isocyanate, epoxy

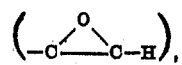

and the like.

The simplest procedure is to prepare a pre-polymer with from 1 to 30 mole percent of a dibasic acid of the general structure:

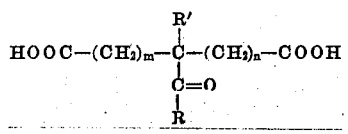

or with a diamine having the structure:

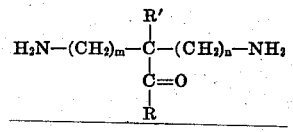

or with a glycol of the structure:

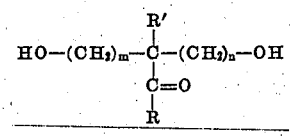

Examples of such suitable dibasic acids are keto substituted $\alpha, \omega$-dibasic aliphatic acids, such as $\gamma$-acetyl pimelic acid, $\gamma$-benzoyl pimelic acid, $\gamma$-acetyl suberic acid, $\delta$-acetyl azelaic acid and the like. These may be condensed with conventional glycols, e.g., ethylene glycol or propylene glycol, to photodegradable polyester resins, or with conventional diamines, e.g., hexamethylene diamine and pentamethylene diamine, to form photodegradable polyamides.

Examples of such suitable keto substituted $\alpha, \omega$-diamines are $\gamma$-acetyl-pentamethylene-$\alpha, \omega$-diamine and $\gamma$-acetyl-hexamethylene-$\alpha, \omega$-diamine. These can be condensation polymerised by reaction with conventional dibasic acids to form photodegradable polyamides.

Examples of suitable such keto substituted $\alpha, \omega$-glycols are $\gamma$-acetyl-pentamethylene-$\alpha, \omega$-glycol and $\gamma$-acetyl-hexamethylene-$\alpha, \omega$-glycol.

These can be condensation copolymerised with conventional dibasic acids, e.g., terephthalic acid, adipic acid or isophthalic acid, to form photodegradable polyester resins for use in the present invention. Alternatively they can be condensed with dibasic isocyanates to form photodegradable polyurethanes.

The inclusion of the ketone group in the polymer chain permits the absorption of ultraviolet light in the range from 3,000 A – 3,600 A, and in solution all copolymers containing this ketone linkage adjacent to the chain will degrade quite rapidly when exposed to U.V. light. The degradation occurs as a result of scission of the main chain of the polymer at the carbon atom adjacent to the carbonyl, and usually results in the formation of a double bond.

The amount of ketone carbonyl included in the polymer may range from about 0.1 mole percent to about 30 mole percent. Ranges from about 0.1 to about 10 mole percent are preferred. The amount will usually be determined by the rate and extent of degradation required. Higher concentrations lead to faster degradation rates up to a limit determined by the thickness of the coating. If too much carbonyl is included only the surface layers will absorb the U.V. light and very little degradation will occur in the bulk of the material. The optimum concentration can easily be calculated for a given specimen thickness using the Beer-Lambert Law of photochemistry. For this reason, polymers to be applied as thin coating films may contain higher carbonyl concentrations than those used in thicker coating films. For example the approximate film thickness at which 90 percent of the ultraviolet light of 3,130 A wavelength is absorbed by copolymers containing various concentrations of aliphatic ketone groups is indicated in the following table:

| Mole % ketone carbonyl | Film thickness for 90% absorption |
| --- | --- |
| 5.5% | 0.10 cm |
| 2.8% | 0.20 cm |
| 1.5% | 0.40 cm |
| 0.5% | 1.0 cm |

The rate at which coatings degrade in the presence of ultraviolet light can best be determined in the laboratory using a mercury vapor arc lamp of the type used to simulate sunlight for obtaining a suntan indoors. A typical lamp is the General Electric Type RS sunlamp which is designed to give its maximum output in the erythermal range of from about 2,900 to 3,400 A. Alternatively one may use Xenon arc weatherometers, provided the lamp output is not shielded to remove radiation in this wavelength region. Exposure times can be calculated from the known intensity of the sun's ultraviolet radiation in this region. After exposure to a known intensity of radiation for a given length of time the protective ability of the coating against air and moisture may be estimated by, for example, subjecting the coated panels to standard tests such as a salt fog spray, or water vapor condensation chamber. Panels coated with resins having the desirable properties of my invention will have good resistance to corrosion in such tests prior to exposure to ultraviolet light. On the other hand, after exposure for controlled periods either to artificial ultraviolet radiation from a "sunlamp" or to natural ultraviolet from the sun, the resistance of the coating to such treatment is minimal and rapid corrosion of the metal panel ensues.

The process of my invention can be summarized as follows:

1. A coating resin is synthesized by any of the well known methods of preparing such polymers, containing from 1 to 30 mole percent of a group of the general structure:

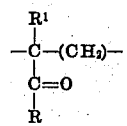

2. This coating is applied to a substrate, preferably to the exterior of a metal container either before or after fabrication of the container. The material for the container is selected from those metals having the property of relatively rapid corrosion in the presence of water and air, such as for example mild steel, tin plate, tin-free steel, etc.

3. In some cases, where an initially water susceptible resin is used, the coating may be cross-linked by a suitable procedure (such as baking, or subjecting it to a chemical or radiation treatment) to make it suitably water resistant and impart to it suitable mechanical properties such as abrasion and solvent resistance. This coating, because of its chemical composition, now has the ability to protect the metal against corrosion for a period of time substantially longer than the expected shelf life of the substance which is to be contained in the container.

4. When this container is discarded where it is exposed to the ultraviolet light of the sun, the coating degrades over a period of time depending on the thickness of the coating, the amount of ketone carbonyl contained therein, and the intensity of the sunlight to which it is exposed, so that it no longer protects the metal of the container and rapid corrosion of the metal takes place to metal salts or oxides which become part of the soil.

It will be clear from the foregoing that the coating may contain suitable dyes, pigments, extenders, resins, etc., provided only that these do not substantially interfere with the action of ultraviolet light on the coating, or sensitize the degradation at longer wavelengths such as by visible light.

The process and products of this invention are illustrated but not limited by the following examples:

Example 1

A coating resin was made up from the following components:

3 moles trimellitic anhydride
7 moles propylene glycol
0.5 mole 3 acetyl pimelic acid
0.5 mole adipic acid The reagents were placed in a resin flask and heated slowly over a 2-hour period with a reflux condenser to 350°F and maintained at this temperature for 4 hours. The resultant acid number of the resin was 48.

The resin was then poured with stirring into a vessel at 120°–140°F containing an aqueous solution of dimethyl ethanolamine sufficient to neutralize the acid groups and containing 0.1 percent dioctyl sodium sulphosuccinate to prevent cratering. After the dilution the solids content was 45 percent.

The resin was applied with a brush to a standard 4 inch × 6 inch sheet of tin-plate and cured for 25 minutes at 400°F. A tough, water-resistant coating was obtained which gave good protection to the tin-plate for a period of greater than 6 days in the salt-fog spray cabinet. However, when the coated tin-plate was exposed for 48 hours at a distance of 8 inches from a Westinghouse 275 watt sunlamp for 48 hours and subsequently to the salt-fog spray, corrosion of the metal substrate occured after only 16 hours in the salt-spray test.

Example 2

A resin was made up by the procedure of example 1 having the following composition:

3 moles trimellitic anhydride
7 moles propylene glycol
1 mole adipic acid

After coating and curing, panels exposed to ultraviolet radiation for 48 hours showed no corrosion after 6 days in the salt-fog chamber.

Example 3

An acrylic coating resin was prepared from the following ingredients:

| | | |
|---|---|---|
| Cellosolve | 230 grams | Part A |
| Butyl Acrylate | 600 grams | |
| Styrene | 200 grams | |
| Acrylic Acid | 100 grams | Part B |
| Hydroxy propyl Methacrylate | 100 grams | |
| Benzoyl Perioxide | 15 grams | |
| t-butyl Perbenzoate | 5 grams | |

Part A was charged to a resin flask equipped with agitator and reflux condenser and heated to a reflux temperature of 270°F. After applying a carbon dioxide blanket, Part B was added, under continuous agitation, at a constant rate over a 2 hour period. The temperature was maintained at 270°F. throughout the monomer addition and for 1 hour thereafter. 100 g. of the resultant polymer were blended with 20 g. melamine and 100 g. xylene, sprayed on tinplate panels and baked for 15 minutes at 50°F. Half of the panels were exposed for 72 hours at a distance of 4 inches from a Westinghouse 275 Watt sunlamp. All the panels were then placed in a salt fog spray cabinet for 24 hours. No damage occured to either set of coatings or tinplate by this test.

Example 4

Using the procedure and materials of example 3, with the addition of 50 grams of methyl vinyl ketone, a resin was synthesised, blended with melamine and xylene and sprayed on tinplate panels. After exposure to ultraviolet radiation for 72 hours and salt fog spray for 24 hours, the panels showed extensive rusting in the areas which had been exposed to U.V. Radiation from the sunlamp.

Example 5

An acrylic coating resin was prepared from the following materials:

| | | |
|---|---|---|
| Xylene | 436 grams | Part A |
| Butyl Acrylate | 226 grams | |
| Styrene | 224 grams | |
| Acrylic Acid | 8 grams | |
| Hydroxy Propyl Methacrylate | 152 grams | Part B |
| Butyl Methacrylate | 104 grams | |
| Methyl Methacrylate | 96 grams | |
| Benzoyl Peroxide | 8 grams | |
| t-butyl Perbenzoate | 8 grams | |

Part A was charged to a resin flask equipped with agitator and reflux condenser and heated to a reflux temperature of 282°F. After applying a carbon dioxide blanket, Part B was added, under continous agitation, at a constant rate over a 60 minute period. Reflux and stirring were maintained for 2½ hours after the end of the monomer addition.

After reduction to 50 percent solid content with more xylene, 50 grams of the resin solution were blended with 21.5 grams of a melamine resin and sprayed on tinplate panels. After 72 hours exposure to ultraviolet radiation, followed by 24 hours salt fog spray, the panels were unaffected.

Example 6

Employing the same procedure and materials as in Example 5, except for the addition of 46 grams of methyl vinyl ketone to the monomer blend, coated tinplate panels were prepared. After exposure to 72 hours ultraviolet radiation and 24 hours salt fog spray, the panels exhibited pronounced rusting. The portion unexposed to the U.V. lamp showed no sign of rusting.

Example 7

A self-curing acrylic resin was prepared from the following materials:

| | | |
|---|---|---|
| Xylene | 229 grams | Part A |
| Butanol | 176 grams | |
| Acrylamide | 46 grams | |
| Acrylic Acid | 16 grams | |
| n-butyl Formcel | 74 grams | |
| α-methyl Styrene | 33 grams | |
| Hydroxy Propyl Methacrylate | 75 grams | Part B |
| Methacrylonitrile | 36.4 grams | |
| Styrene | 364 grams | |
| Azobisisobutyronitrile | 12.3 grams | |
| t-butyl Perbenzoate | 4.4 grams | |
| Xylene | 45 grams | Part C |
| Benzoyl Peroxide | 0.8 gram | |

Part A was charged to a resin flask, raised to reflux and a carbon dioxide blanket applied. To the stirred solvent was added Part B over 3½ hours, the reflux temperature of 255°F. being maintained, throughout and for a further period of 3 hours. Then Part C was added and reflux maintained for 3 hours more.

The resultant resin was sprayed on tinplate and baked at 350°F. for 20 minutes. After 72 hours exposure to ultraviolet radiation and 48 hours of salt fog spray the panels were unaffected.

Example 8

A resin was prepared using the same procedure and materials as in Example 7 but with the addition of 41 grams of methyl vinyl ketone to the monomers blend.

This resin was sprayed on tinplate and baked at 350°F. for 20 minutes. After exposure to 72 hours of ultraviolet radiation and 24 hours salt fog spray, the coating was crazed. After a further 24 hours salt fog spray significant rusting was evident. The unexposed portion of the coating and tinplate was unaffected by the salt fog spray.

Example 9

A 50:50 mixture of the resins of Examples 7 and 8 was sprayed on tinplate and exposed to similar amounts of ultraviolet radiation and salt fog spray. The panels exhibited pronounced degradation but intermediate to those in Examples 7 and 8. The portion of the tinplate unexposed to the sunlamp was unaffected by the salt fog treatment.

An alternative photochemically decomposable resin which will disintegrate in ultraviolet light when exposed to sunlight is polypropylene which has been subjected to a controlled oxidation process, to impart a ketone carbonyl content thereto, at least on the surface of the polypropylene, of from about 0.1 to about 2 mole per cent. Polypropylene, as is well known, does not need to be cured in order to become water resistant. Polypropylene can be oxidised in air to the desired extent, for example, in a fluidised bed or by stirring the polypropylene powder in a reactor in the presence of oxygen at the desired temperature, within the range 80°–220°C. depending upon the rate of oxidation required and the concentration of ketone necessary. Such an oxidation process is conveniently carried out on the powder produced by the usual slurry polymerization process before any additives such as antioxidants are added and before the powder is compounded into pellets. Catalysts such as peroxides and U.V. light may be used to accelerate the oxidation process.

Alternatively, the polypropylene powder can be chemically oxidised by use of strong oxidising agents such as chromic acid, to impart the desirable ketone carbonyl group content thereto.

Further, polypropylene can be oxidised in film form to impart the necessary ketone carbonyl content thereto, for example, by passing the film through a zone heated to from 60°–140°C. in an atmosphere of air or oxygen, or by subjecting the film to corona discharge. In this manner, the corrodible container may first be coated with a film of non-oxidised polypropylene and then the coated container may be treated so as to impart the necessary U.V. degradability to the polypropylene, by oxidation thereof.

In the case of polypropylene, the keto carbonyl groups are not, in general, located in side chains, but are present along the main chain or backbone of the polymer, and still give the desired effect.

Polypropylene is akin to the keto-containing vinyl polymers referred to in that it is thermoplastic and non-water soluble. Such vinyl polymers can be applied to metal container surfaces by any of the well known application techniques. These include hot melt application (by spraying, dipping, rolling, spreading, extruding, etc.) onto the metal, solution casting, application from solvent solutions with subsequent evaporation of the solvent, and the like. If desired, the metal surface can be pre-treated by suitable means to improve the adhesion of the resin and the metal. This can be done by application of primers or adhesives between the metal and the coating, but in such case a a primer or adhesive must be chosen which is water susceptible, so that it does not protect the metal after degradation of the coating.

Example 10

Resin samples were prepared (a) in accordance with Example 7, (b) in accordance with Example 8 and (c) by blending equal parts of a resin prepared according to Example 7 and a resin prepared according to Example 8. These resin samples were each applied to 10 mil tinplate using a No. 24 Piano Wire applicator from 35 percent solids solutions. After curing for 20 minutes at 350°F. the coatings had thicknesses ranging from 1.0 to 1.3 mils. Test panels were exposed at an angle of 45° South on a test rack in Bolton, Ontario, Canada, initially in November. Both the coatings containing ketone groups (Example 8 and blend of 7 and 8) were substantially degraded after 8 months (including 4 winter months) and extensive rusting of the steel occurred. The coating which did not contain ketone groups (Example 7) was unaffected by this weathering test and the steel was completely undamaged.

Example 11

A resin was prepared by the procedure of example 8 except that 41 grams of phenyl vinyl ketone was used in place of methyl vinyl ketone. The resin was sprayed on tinplate and baked at 350°F. for 20 minutes. After 10 hours exposure to ultraviolet radiation and 24 hours salt fog spray, substantial rusting of the panel occurred. A similar resin prepared using 41 grams methyl isopropenyl ketone was also photosensitive but required ultraviolet exposure of more than 100 hours before rusting occurred.

Example 12

Diethyl butyryl succinate was prepared by the method of Patrick (Journal of Organic Chemistry 17 1009 (1952)) and hydrolized to butyryl succinic acid.

A resin was prepared by the procedure of example 2 with the addition of 0.10 mole butyryl succinic acid. After coating and exposure to ultraviolet light and salt fog spray as described in example 1, substantial corrosion of the panel occurred.

Example 13

Copolymers of acrylonitrile, methylacrylate and methyl vinyl ketone were prepared by the following procedure:

Approximately 20 cc of total monomers were dispersed in 100 cc of distilled water in a screw-capped brown bottle. 1.0 ml. of 2 percent aqueous ammonium persulfate solution was added, along with 1.0 ml of 2 percent aqueous sodium bisulfite. The bottle was flushed 1 minute with nitrogen, sealed and agitated for 20 hours at 23°C. The resulting copolymer was filtered, washed several times with distilled water and dried in a vacuum oven at 50°C. The molecular weight of the polymer was estimated by determining the intrinsic viscosity in dimethyl formamide solution.

A summary of the compositions made is given in the table below.

| Polymer No. | Composition Mole % AN | MA | MVK | Intrinsic Viscosity | Molecular Weight |
|---|---|---|---|---|---|
| T-1 | 75 | 23 | 2.0 | 5.48 | 4.8 × 10⁵ |
| C-5 | 75 | 25 | 0 | 5.91 | 5.2 × 10⁵ |

Both polymers were dissolved in dimethyl formamide at a concentration of 0.5 percent and a portion of the solution placed in a quartz tube and irradiated in an ultraviolet accelerometer (Incident intensity $1.1 \times 10^{-7}$ einsteins per cm² per sec. for radiation of wavelength less than 330 n.m.). The rate of photodegradation was followed by the change in solution viscosity as a function of exposure time with the results shown below:

| Time of irradiation | $\eta SP/C$ Copolymer T-1 | Copolymer C-5 |
|---|---|---|
| 0 | 6.7 | 6.6 |
| 30 mins. | 1.4 | 5.0 |
| 60 mins. | 1.0 | 4.8 |
| 100 mins. | 0.8 | 4.4 |

From these results it is clear that the molecular weight of the ketone-containing copolymer decreases much more rapidly than that of the pure acrylonitrile-methylacrylate copolymer.

Similar results were obtained when thin films of the polymer were prepared by casting from acetonitrile solution onto a Teflon plate. The thicknesses were 0.073 mm for T—1 and 0.035 mm for C—5. After 100 minutes exposure the viscosity ratio $\eta SP/C$ for T—1 was 2.4 while that for C—5 was 4.5. Similar results were observed with thick films of approximately 1 mm thickness. After irradiation the films from the ketone containing copolymers were quite brittle and shattered under moderate finger pressure.

Coatings of T—1 and C—5 copolymers were prepared by brushing 2 percent solution in acetonitrile on panels of mild steel, followed by air drying overnight. Both coatings showed excellent protection of the steel against accelerated rusting prior to exposure to the ultraviolet accelerometer. However, after 24 hours exposure in the accelerometer the T—1 copolymer film showed extensive crazing and gave little protection against rusting, while the C—5 coating continued to show excellent moisture barrier properties.

Example 14

A copolymer of acrylonitrile, methyl acrylate and methyl vinyl ketone was prepared from the following recipe:

75g acrylonitrile monomer
23g methylacrylate
2g methyl vinyl ketone
400 cc. water
5 ml 2 percent solution of ammonium persulfate
5 ml 2 percent solution of sodium bisulfite
2.5g dodecyl mercaptan Reagents were placed in a stirred flask and heated under nitrogen at 40°C for 4.2 hours. After cooling, the polymer was filtered off, washed several times with distilled water and dried under vacuum at 50°C. The yield was 78.1 grams of polymer having a viscosity ratio $\eta SP/C$ of 2.32 and a molecular weight of $1.5 \times 10^5$ and was designated T—14. A similar preparation using 25g methylacrylate and no methyl vinyl ketone gave a yield of 91.5 grams of polymer of viscosity ratio $\eta SP/C = 1.83$ (designated C—10).

Thick films (1 mm) were prepared by compression molding and exposed in the ultraviolet accelerometer. After 66 hours the viscosity of T—14 had decreased from 2.32 to 1.44 while C—10 increased from 1.83 to 1.88.

Coatings of these compositions from acetonitrile solution onto mild steel showed the same results as in example 13, that is, that coatings from copolymers containing ketone groups (T—14) degraded relatively rapidly on exposure to ultraviolet radiation, permitting access of water to the steel substrate and subsequent rusting of the steel.

What I claim as my invention is:

1. A corridible metal container coated on at least one surface with a coating resin which is initially water impermeable but which becomes water permeable after exposure to ultraviolet light wherein the coating resin is a copolymer of a vinyl monomer of the general structure

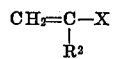

where $R^2$ is hydrogen or a lower alkyl group, and X is hydrogen, halogen, nitrile, phenyl, carboxylic acid, carboxylic acid lower alkyl ester, acetate, or alkenyl, and a vinyl ketone of the general formula

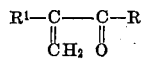

where $R^1$ represents hydrogen, an alkyl group having from 1 to 6 carbon atoms, a cycloalkyl group, an aryl group or an alkaryl group having from one to seven carbon atoms, and R represents an alkyl group, a cycloalkyl group, an alkenyl group, an aryl group or an alkaryl group having one to ten carbon atoms, wherein the resin contains from 0.1 to 10 mole per cent of ketone carbonyl.

2. A metal container as claimed in claim 1 in which the resin is applied to the surface of the container from a liquid coating formulation.

3. A metal container as claimed in claim 1 in which the resin is cross-linked after it is applied to the substrate so as to impart water resistance and water impermeability to the resin.

4. A metal container according to claim 1 wherein the vinyl monomer is ethylene, styrene, methyl acrylate, methyl methacrylate, methacrylonitrile, acrylonitrile, butadiene, isoprene, vinyl acetate, vinyl chloride, acrylic acid or methacrylic acid.

5. A metal container according to claim 4 wherein the vinyl ketone is methyl vinyl ketone, ethyl vinyl ketone, propyl vinyl ketone, isopropyl vinyl ketone, butyl vinyl ketone, methyl isopropenyl ketone, ethyl isopropenyl ketone, methyl isobutenyl ketone or phenyl vinyl ketone.

* * * * *